(12) United States Patent
Read

(10) Patent No.: US 7,736,067 B2
(45) Date of Patent: Jun. 15, 2010

(54) FIBER OPTIC SEAL

(75) Inventor: Barry Allen Frank Read, Bournemouth (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/249,433

(22) Filed: Oct. 10, 2008

(65) Prior Publication Data

US 2010/0092145 A1   Apr. 15, 2010

(51) Int. Cl.
*G02B 6/36* (2006.01)
(52) U.S. Cl. .......................................... 385/53; 385/55
(58) Field of Classification Search .................... None
See application file for complete search history.

(56) References Cited

U.S. PATENT DOCUMENTS

| 3,734,594 | A | * | 5/1973 | Trambarulo | 385/70 |
|---|---|---|---|---|---|
| 4,759,601 | A | | 7/1988 | Knutsen | |
| 5,685,727 | A | * | 11/1997 | Cairns | 439/139 |
| 6,315,461 | B1 | * | 11/2001 | Cairns | 385/56 |
| 6,464,405 | B2 | * | 10/2002 | Cairns et al. | 385/56 |
| 6,644,402 | B1 | | 11/2003 | Sharma | |
| 6,736,545 | B2 | * | 5/2004 | Cairns et al. | 385/56 |
| 7,186,033 | B2 | | 3/2007 | Deans | |
| 7,220,067 | B2 | | 5/2007 | Rubinstein | |
| 7,261,162 | B2 | | 8/2007 | Deans | |
| 7,292,345 | B2 | | 11/2007 | Hadley | |
| 7,424,176 | B2 | | 9/2008 | Kension | |
| 2002/0003931 | A1 | * | 1/2002 | Cairns et al. | 385/56 |
| 2003/0099453 | A1 | * | 5/2003 | Moidu et al. | 385/138 |
| 2006/0260817 | A1 | | 11/2006 | Meijer | |
| 2008/0095496 | A1 | | 4/2008 | Varadarajan | |

FOREIGN PATENT DOCUMENTS

| EP | 206943 A2 | 12/1986 |
|---|---|---|
| EP | 206943 A3 | 10/1987 |

* cited by examiner

*Primary Examiner*—Sung H Pak
(74) *Attorney, Agent, or Firm*—Rodney V. Warfford; Daryl R. Wright; Trop Pruner Hu P.C.

(57) ABSTRACT

A fiber sealing apparatus in which a seal about an outer fiber optic cable may be formed relatively independently of a seal about an inner fiber optic line. The fiber optic sealing apparatus may comprise a housing containing a central passageway there through. The housing may further comprise a fiber seal and a seal energizer configured to interact with the fiber seal. An intermediate cap may be coupled with an end of the housing and configured to apply a load to the seal energizer. An end cap may be coupled with an end of the intermediate cap and configured to seal against an inserted fiber optic cable. Applying the load to the seal energizer may result in a barrier forming around an inserted fiber optic line.

20 Claims, 3 Drawing Sheets

FIBER OPTIC SEAL

BACKGROUND

1. Field of the Invention

The field of the invention pertains to sealing devices for use in a downhole environment, specifically, for sealing against a fiber optic cable.

2. Description of the Related Art

The following descriptions and examples are not admitted to be prior art by virtue of their inclusion in this section.

In many well related operations, fiber optic control lines are used to establish communication with and to control downhole components. For example, fiber optic distributed temperature sensors may be used to measure the temperature along the entire length of a wellbore as well as communicate the temperature data to the surface of the well. However, sealing the fiber optic line portion of the fiber optic cable against severe well pressures and environmental conditions can be challenging. A repeatable balance must be established between providing a seal against the fiber optic line without applying so much force that the fiber optic line is subsequently damaged.

In conventional applications, an end cap may be secured to a housing in order to provide a compressive force on a cable or control line passing there through. The compressive force may be controlled though precise control of the torque applied to the end cap and/or accurate predictions of the occupying space of the cable seal when the end cap is fully tightened. However, most metal or shielded cables and control lines are tolerant of a wide range of compressive pressures. Accordingly, cables and control lines may be rapidly sealed through the use of less precisely controlled processes without risk of a subsequent increase in the potential for damaging cables and control lines.

On the other hand, fiber optic cables are much more susceptible to damage resulting from the application of too large of a compressive force. The fragile nature and the miniature size of the fiber optic line requires more control than typically used in sealing a control line. In the field, precisely controlling the torque so as to avoid compressive damage to a fiber optic cable may be costly and time consuming. In addition, in order to accurately determine the shape and quantity of the sealing material and housing so as to provide a sufficient compressive force while still allowing for a securing torque for the end cap requires extensive modeling and/or testing of various configurations for a range of operating conditions. In some cases, fiber optic lines are sealed using epoxy between the fiber and the barrier.

SUMMARY

In general, the present invention provides an apparatus and method for downhole sealing of a fiber optic cable. A sealing apparatus may comprise a housing, one or more end pieces, a compression device, and a sealing device. Tightening the end piece against the housing applies a measured compression from the compression device, thereby sealing the fiber optic cable.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a fiber optic sealing apparatus used to provide a consistent seal pressure against a fiber optic cable while minimizing the risk of damaging the cable. As configured, the end caps of the sealing apparatus may be tightened to a securing torque against the shoulders of the sealing housing. The compressive seal pressure applied to the fiber optic cable may be determined relatively independently of the torque used to secure the end caps to the sealing housing. An inner surface of the end cap presses against a resilient member, applying a predictable compressive pressure to the fiber seal regardless of a range of torque values applied to the end cap. The seal energizer may only impart sufficient force to form a low pressure seal, with the subsequent hydraulic pressure generating higher sealing forces proportional to the magnitude of the pressure. In addition, the other diameter of the seal has the effect of increasing the sealing forces proportional to the square of this diameter. However, control of the diameter must be governed to avoid generating too high a sealing force and that the seals have to act concentrically such that the delicate nature of the fiber is not damaged in any manner. Care must be exercised to avoid generating a shear force to the side of the fragile fiber. The amount of force the fiber is subjected to is a function of the seal diameter, the coefficient of friction between the seal and the fiber, and extrusion of the seal material at the pressure interface.

Figure 1:
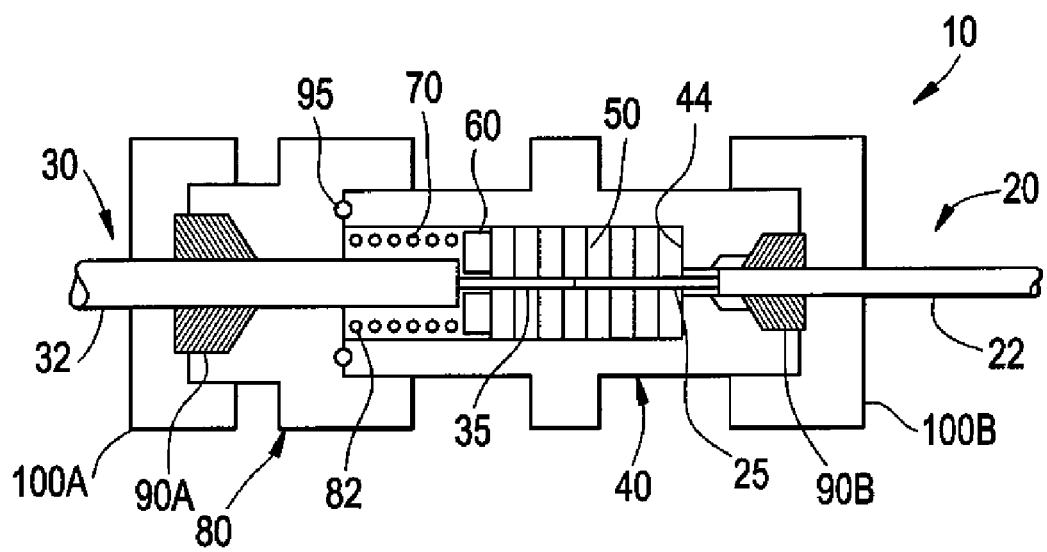
FIG. 1 is a cross-sectional view taken along a longitudinal axis of a sealing apparatus according to an embodiment of the present invention.

Referring generally to FIG. 1, one illustrative embodiment of a fiber optic sealing apparatus 10 of the present invention is shown. The sealing apparatus 10 may be used to join two ends of a fiber optic cable 20 and 30. Fiber optic cable 20 may comprise an outer cable housing 22 and an inner fiber optic line 25. Similarly, fiber optic cable 30 may comprise an outer cable housing 32 and an inner fiber optic line 35. In some cases, the inner fiber optic line 25 may be joined to the inner fiber optic line 35 via a fuse connection, for example. In other cases, only a single fiber optic cable 20, 30 may be used and the inner fiber optic line 25, 35 connected to a component or receiver. In still other situations, a fiber optic cable 20, 30 may be cut or severed in order to facilitate routing of the fiber optic cable 20, 30 along a downhole production tubing (not show), for example. The inner fiber optic line 25, 35 may comprise various coatings and/or jackets depending upon application and necessary protection from the operating environment.

Fiber optic cable 20 may enter into a housing 40 of the sealing apparatus 10 from one end while fiber optic cable 30 enters from an opposing end. The housing 40 may be approximately symmetrical about a center axis and contain a passageway extending longitudinally there through. It should be noted that the housing 40 and passageway shown in FIG. 1 are intended to illustrate one possible application of the present invention, and are not intended to limit the invention scope. A wide variety of internal and external shapes and configurations are possible depending upon the specific application of the sealing apparatus 10.

A fiber seal 50 may be contained within the passageway of the housing 40. The fiber seal 50 may provide a barrier seal around the inner optical fiber lines 25, 35. The seal material should be flexible enough under load to deform sufficiently to provide a seal between the optical fiber and passageway of the housing 40, but also sufficient rigid to not damage or induce unacceptable optical losses to the optical fiber. The fiber seal 50 may be of one piece or several pieces stacked together of varying materials and/or properties, such that the above conditions are met. The selection criteria for the seal material should be dependent upon pressure, temperature, and the nature of the fiber to be contained by the barrier. The fiber seal 50 and other components should be manufactured to specific sizes and tolerances such that application of a maximum force upon the fiber seal 50 does not induce lateral movement which may impair the optical fiber. One illustrative example of a fiber seal 50 is a 25% glass filled polytetrafluoroethylene (PTFE), among others.

One end of fiber seal 50 abuts an internal boss 44. The internal boss 44 may be configured to prevent the fiber seal 50 from extruding out of the end of the housing 40. The internal boss 44 may contain an orifice sized to accommodate the passage of inner fiber optic line 25. An opposing end of the fiber seal 50 may abut an anti-extrusion component 60. The anti-extrusion component 60 may be configured to move within the passageway relative to the housing 40. For example, the anti-extrusion component 60 may translate along at least a portion of the longitudinal length of the passageway as shown in FIG. 1. One surface of the anti-extrusion component 60 may abut the fiber seal 50. An opposing surface of the anti-extrusion component 60 may abut a seal energizer 70.

The seal energizer 70 may be configured to apply a compressive force against the fiber seal 50 via the anti-extrusion component 60. The seal energizer 70 may be of various forms to deform the fiber seal 50 such that a sufficient barrier is formed. The seal energizer 70 may be a resilient member such as a coil spring or a series of Bellville washers for example, among others. For example, in some cases the seal energizer 70 may be configured to apply an axial force in the order of 40 lbf. The seal energizer 70 may abut against a surface 82 of an intermediate cap 80. The intermediate cap 80 may be coupled with an end of the housing 40 such that the surface 82 of the intermediate cap 80 abuts against the end surface of the housing 40. In some cases the intermediate cap 80 may comprise internal threads for threadably attaching to corresponding external threads of the housing 40. The seal energizer 70 and the intermediate cap 80 may be configured to accommodate the outer cable housing 32. In still other cases, a housing seal 95 may be provided between the intermediate cap 80 and the abutting end of the housing 40.

As stated previously, one end of the surface 82 of the intermediate cap 80 may abut against the seal energizer 70. An opposing end of the intermediate cap 80 may be configured to accommodate an outer housing seal 90A. Since the outer cable housings 22, 32 are not as sensitive to compression forces as the inner fiber optic lines 25, 35, the outer housing seal 90A may be any material typically used to provide a downhole seal against a control line, for example. Generally, some form of elastomer or other type of material may be appropriate for use as an outer housing seal 90A, 90B. A first end cap 100A may capture and compress the first outer housing seal 90A between the first end cap 100A and an end of the intermediate cap 80. In some cases, the first end cap 100A is threadably secured to the intermediate cap 80. Tightening the first end cap 100A compresses the first outer housing seal 90A against the outer cable housing 32. Accordingly, an external environment barrier is formed between the outer cable housing 32 and the inner passageway of the housing 40 of the sealing apparatus 10.

The opposing end of the housing 40 may be configured to accommodate a second outer housing seal 90B and a second end cap 100B. As with the first end cap 100A and first outer housing seal 90A, tightening the second end cap 100B against the opposing end of the housing 40 may compress the second outer housing seal 90B against the outer cable housing 22. As the second outer housing seal 90B is compressed, an external environment barrier is formed between the outer cable housing 22 and the inner passageway of the housing 40. In some embodiments, both of the outer housing seals 90A, 90B are formed independently of the fiber seal.

Figure 2A:
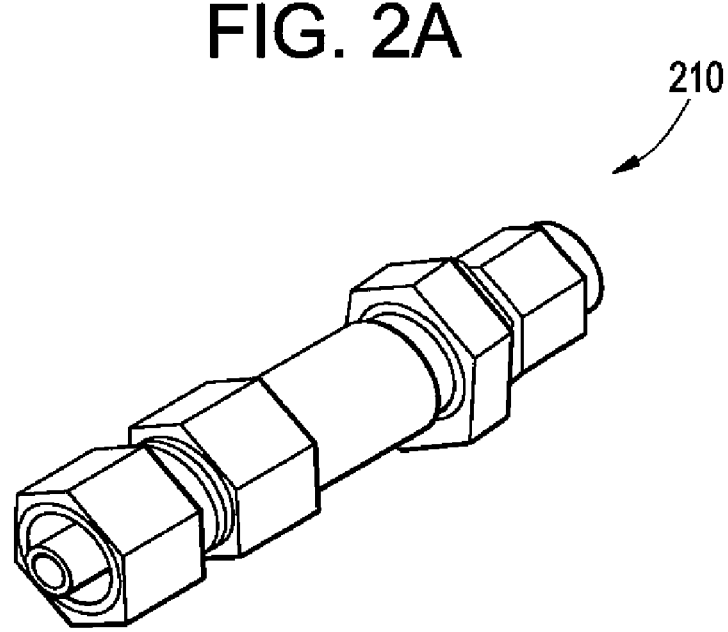
FIG. 2A is a perspective view of a sealing apparatus according to another embodiment of the present invention.
Figure 2B:
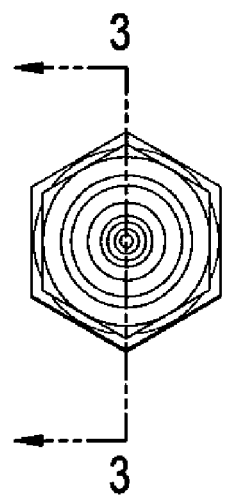
FIG. 2B is an end view of the sealing apparatus of FIG. 2A according to another embodiment of the present invention.

Referring generally to FIGS. 2A and 2B, another illustrative embodiment of a fiber optic sealing apparatus 210 of the present invention is shown. The sealing apparatus 210 may be configured to facilitate a reduction in fiber optic lines, for example, going from ¼ inch fiber optic cable 230 to ⅛ inch fiber optic cable 220. Even though this embodiment is represented as a connection between two fiber optic cables 220 and 230, one or both fiber optic cables 220, 230 may be replaced with a component(s) configured to react or provide fiber optic signals for example.

Fiber optic sealing apparatus 210 may comprise a housing 240 made of metal, such as stainless steel for example. The housing 240 may be substantially symmetrical in some cases and configured to contain a central passageway able to accommodate a fiber seal 250. The fiber seal 250 may be sized and configured to allow an inner fiber optic line (fiber) or two fibers joined together (for example, in some cases the inner fiber optic line has a diameter of 0.155 mm), to pass through the center of the fiber seal 250, thereby providing a barrier seal about the fiber(s). In some cases in which the housing 240 is joined to a fiber optic actuated component, the fibers from fiber optic cable 230 may pass through the center of the fiber seal 250 in order to connect to the component. In other cases, one or more fibers from fiber optic cable 230 may be joined together with corresponding fibers from fiber optic cable 220 and the joints, or other portions of the fibers may pass through the center of the fiber seal 250. The fiber seal 250 may comprise a seal material selected for the ability to seal against without damaging the individual inner fiber optic lines. Properties and selection of the seal material may be similar to those described for the fiber seal 50.

Fiber seal 250 may be bordered on each end by a first and second anti-extrusion component 260, 270. In some cases, either the first or second anti-extrusion component 260, 270 may be used for both ends of the fiber seal 250. At least one of the first or second anti-extrusion components 260, 265, may be sized to longitudinally translate along at least a portion of the passageway relative to the housing 240. One surface of the anti-extrusion components 260, 265 may abut the fiber seal 250 and prevent or inhibit the fiber seal 250 from flowing out or beyond a predefined point, for example, such as when subjected to a load and/or downhole environmental conditions.

In the illustrative embodiment shown, the first and second anti-extrusion components 260, 265 may be generally in the form of a stepped cylinder comprising a first circumference and a smaller second circumference surrounding a central passageway. In some cases the second circumference may be configured to fit within a corresponding cylindrically shaped recess provided within the housing 240, such as shown with the second anti-extrusion component 265. Alternatively, or in addition to, the second circumference may be configured to fit within a corresponding recess located in the seal energizer 270, such as shown with the first anti-extrusion component 260. In still other cases, the anti-extrusion components 260, 265 may be configured to accommodate outer fiber optic cable housings, inner protective housings, or other components of the fiber optic cables 220, 230.

Figure 3:
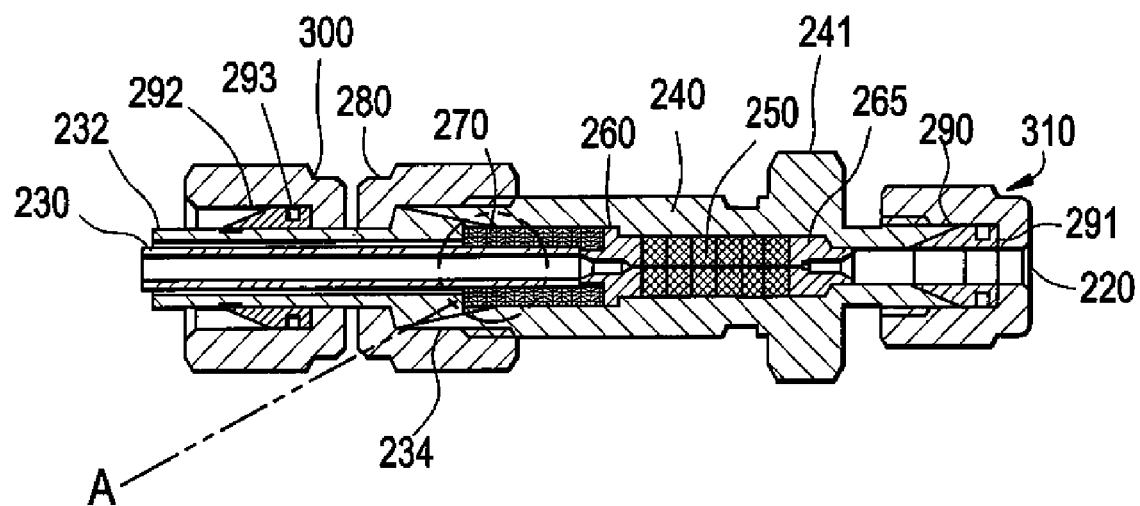
FIG. 3 is a cross-sectional view taken along the section defined by line 3-3 illustrated in FIG. 2B according to another embodiment of the present invention.
Figure 4:
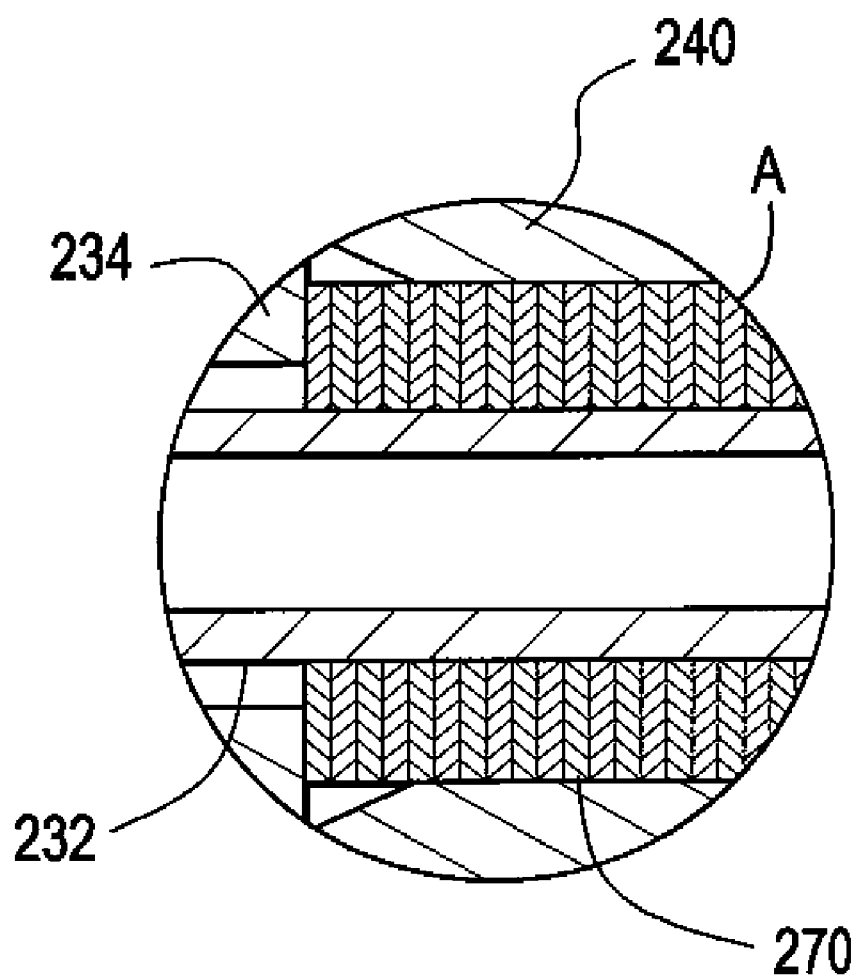
FIG. 4 is a detail view of a portion of a cross-sectional view of FIG. 3 indicated by reference letter A, according to an embodiment of the present invention.

As with the previous embodiment, the seal energizer 270 may be configured to apply a compressive force against the fiber seal 250. The seat energizer 270 may compress the fiber seal 250 via the anti-extrusion component 260. The seal energizer 270 may be of various forms able to deform the fiber seal 250 such that a sufficient barrier is formed. In the illustrative example shown in FIG. 3 and FIG. 4, the seal energizer 270 may comprise a plurality of Bellville washers containing a central passageway. A load may be provided to the seal energizer 270 by an intermediate cap 280 treadably coupled to one end of the housing 240. Applying a torque to the intermediate cap 280 may create a load transmitted via a shaped end 234 of the outer cable housing 232. The shaped end 234 may also prevent or inhibit the intermediate cap 280 from separating from the outer cable housing 232 when the intermediate cap 280 is uncoupled from the housing 240. The housing 240 may have a recess corresponding to the configuration of the shaped end 234. Securing the intermediate cap 280 to the end of the housing 240 may also establish a barrier against the entry of contaminates into the central passageway of the housing 240. However, in some cases, hydraulic pressure may be applied to the seal energizer to exert a subsequent axial force on the seals on the order of an upper limit of 300 lbf.

One tool may be coupled with the intermediate cap 280 and another toot may be coupled with corresponding circumference 241 of the housing 240 in order to provide a sufficient torque to the intermediate cap 280. In the illustrative embodiment shown in FIG. 2B, both the intermediate cap 280 and the corresponding circumference 241 may comprise standard hex shaped profiles when viewed from one end of the fiber optic sealing apparatus 210. As will also be readily appreciated by those of skill in the art, embodiments of the current invention may encompass a wide variety of shapes and coupling configurations designed to enable the connecting and disconnecting of the various components of the fiber optic sealing apparatus 210.

A first end cap 310 may be coupled with an end of the housing 240 opposing the end of the intermediate cap 280. In some cases, the first end cap 310 may be threadably attached to the end of the housing 240 and may be tightened to a torque sufficient to seal front and back ferrules 290, 291 against an outer circumference of the fiber optic cable 220. The first end cap 310 may comprise a central passageway configured to allow the fiber optic cable 220 to pass there through and a central recess configured to accommodate the front and back ferrules 290, 291. For example, first end cap 310 and the front and back ferrules 290, 291 may be standard ⅛ inch metal components (such as stainless steel, among others) configured to accommodate a ⅛ control line.

A second end cap 300 may be coupled with the fiber optic cable 230. Although not shown, the second end cap 300 may be threadably secured to a correspondingly configured component. As with the first end cap 310, the second end cap 300 may contain a central passageway configured to allow the fiber optic cable 230 to pass there through and a central recess configured to accommodate the front and back ferrules 292, 293. For example, second end cap 300 and the front and back ferrules 292, 293 may be standard ¼ inch metal components (such as stainless steel, among others) configured to accommodate a ¼ control line.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A fiber optic sealing apparatus, comprising:
   a housing containing a central passageway which receives a fiber seal and a seal energizer in the form of a resilient member configured to interact with the fiber seal;
   an intermediate cap configured to couple with one end of the housing;
   an end cap configured to couple with one end of the intermediate cap and to seal against a fiber optic cable;
   wherein securing the intermediate cap to the housing results in the resilient member applying a predetermined load to the fiber seal regardless of how tightly the intermediate cap is secured to the housing.

2. The sealing apparatus of claim 1, wherein the seal energizer is a coil spring.

3. The sealing apparatus of claim 1, wherein the seal energizer is at least one Bellville washer.

4. The sealing apparatus of claim 1, further comprising an anti-extrusion component provided between the seal energizer and the fiber seal.

5. The sealing apparatus of claim 1, further comprising a first anti-extrusion member and a second anti-extrusion member abutting a first end and a second end of the fiber seal;
   wherein at least one of the first or second anti-extrusion members transmits the load from the seal energizer to the fiber seal.

6. The sealing apparatus of claim 1, wherein applying the load to the fiber seal results in a barrier formed about an inserted fiber optic line.

7. The sealing apparatus of claim 1, wherein the end cap further contains a cable housing seal for sealing against the fiber optic cable.

8. The sealing apparatus of claim 1, wherein the fiber seal is a glass filled polytetrafluoroethylene material.

9. The sealing apparatus of claim 8 wherein the glass filled polytetrafluoroethylene material comprises approximately 25 percent glass.

10. A fiber optic sealing apparatus, comprising:
    a housing containing a central passageway comprising:
      a fiber seal;
      a seal energizer configured to interact with the fiber seal;
    a first end cap configured to seal against a first fiber optic cable when coupled to one end of the housing;
    an intermediate cap configured to apply a load against the seal energizer when coupled to another end of the housing;

a second end cap configured to seal against a second fiber optic cable when coupled to an end of the intermediate cap;

wherein applying the load to the seal energizer results in the fiber seal forming a barrier about an inserted fiber optic line.

11. The sealing apparatus of claim 10, wherein the seal energizer is at least one Bellville washer.

12. The sealing apparatus of claim 10, wherein the fiber seal is a glass filled polytetrafluoroethylene.

13. The sealing apparatus of claim 10 wherein the seal energizer is a coil spring.

14. The sealing apparatus of claim 10, further comprising an anti-extrusion member located between the seal energizer and the fiber seal.

15. A fiber optic sealing apparatus, comprising:

a housing containing a central passageway with a fiber seal and a seal energizer configured to interact with the fiber seal;

an intermediate cap configured to apply a load against the seal energizer when coupled to one end of the housing, the seal energizer applying a steady load to the fiber seal during coupling of the intermediate cap to the one end of the housing;

an end cap configured to seal against a fiber optic cable when coupled to one end of the intermediate cap;

wherein the seal against the fiber optic cable can be applied substantially independently of applying the load to the seal energizer.

16. The sealing apparatus of claim 15, wherein applying the load to the seal energizer results in the fiber seal forming a barrier about an inserted fiber optic line.

17. The sealing apparatus of claim 15, wherein the seal energizer is a coil spring.

18. The sealing apparatus of claim 15, further comprising an anti-extrusion member positioned between the seal energizer and the fiber seal.

19. The sealing apparatus of claim 15, wherein the fiber seal comprises a glass filled polytetrafluoroethylene.

20. The sealing apparatus of claim 15, wherein another end of the housing is configured to be coupled to a downhole well tool.

* * * * *